(12) United States Patent
Tian et al.

(10) Patent No.: US 8,508,942 B2
(45) Date of Patent: Aug. 13, 2013

(54) ELECTRONIC DEVICE WITH HEAT DISSIPATION STRUCTURE

(75) Inventors: Bo Tian, Shenzhen (CN); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 257 days.

(21) Appl. No.: 13/191,466

(22) Filed: Jul. 27, 2011

(65) Prior Publication Data
US 2012/0300399 A1 Nov. 29, 2012

(30) Foreign Application Priority Data
May 25, 2011 (CN) .............................. 2011 1 036202

(51) Int. Cl.
*H05K 7/20* (2006.01)

(52) U.S. Cl.
USPC ........... 361/695; 361/688; 361/690; 361/694; 361/721

(58) Field of Classification Search
None
See application file for complete search history.

(56) References Cited

U.S. PATENT DOCUMENTS

| | | | | |
|---|---|---|---|---|
| 5,691,883 A * | 11/1997 | Nelson | ........................... | 361/697 |
| 5,793,608 A * | 8/1998 | Winick et al. | ................. | 361/695 |
| 6,031,717 A * | 2/2000 | Baddour et al. | ......... | 361/679.49 |
| 6,088,224 A * | 7/2000 | Gallagher et al. | ............. | 361/695 |
| 6,795,314 B1 * | 9/2004 | Arbogast et al. | ............. | 361/695 |
| 6,958,906 B2 * | 10/2005 | Wu et al. | .................... | 361/679.5 |
| 8,081,457 B2 * | 12/2011 | Guan | ........................... | 361/695 |
| 2006/0181846 A1 * | 8/2006 | Farnsworth et al. | .......... | 361/695 |

* cited by examiner

*Primary Examiner* — Boris Chervinsky
(74) *Attorney, Agent, or Firm* — Altis Law Group, Inc.

(57) ABSTRACT

An electronic device includes an enclosure. The enclosure includes a motherboard area and a power supply area adjacent to the motherboard area, which are both located at a first end of the enclosure, a hard disk drive area for mounting hard disk drives at a second end of the enclosure, and a fan area arranged between the motherboard area and the hard disk drive area.

3 Claims, 1 Drawing Sheet

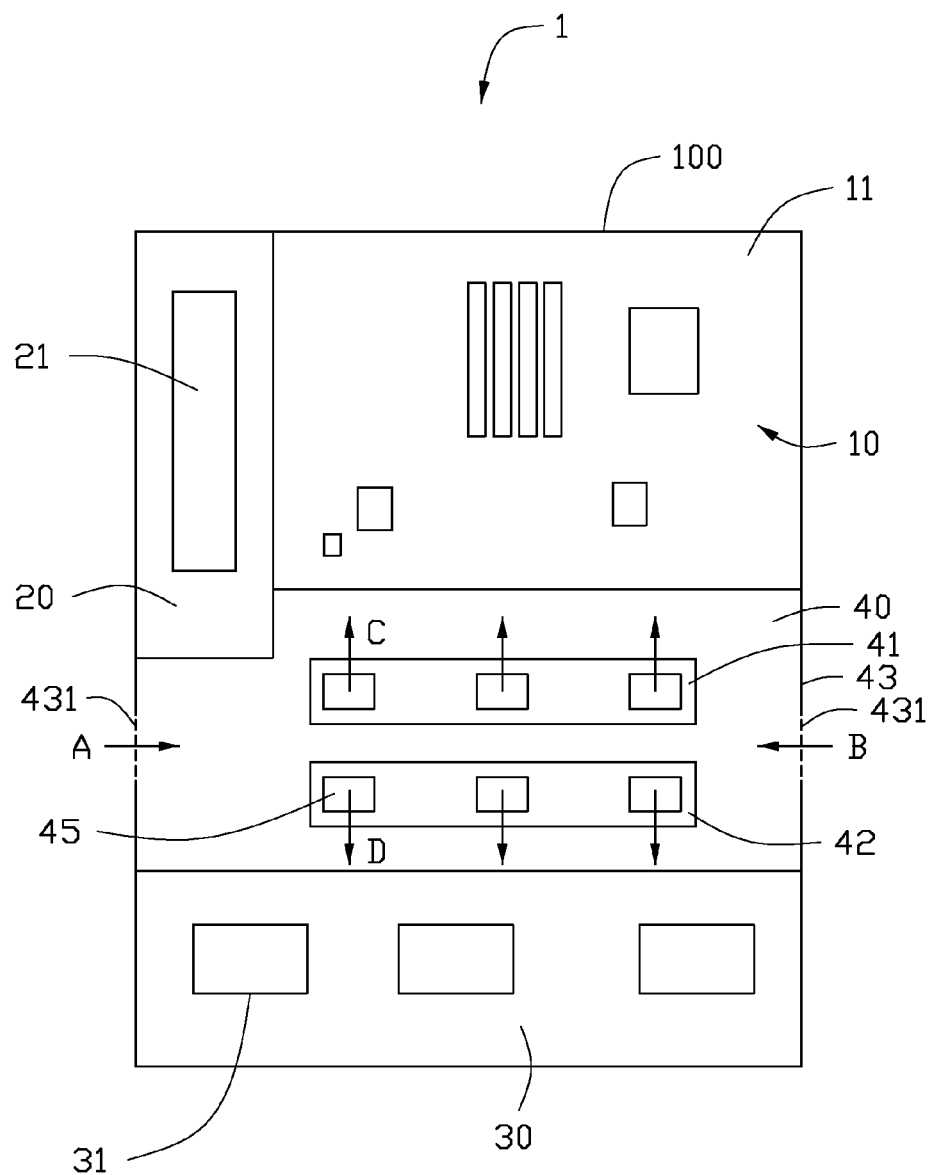

ELECTRONIC DEVICE WITH HEAT DISSIPATION STRUCTURE

BACKGROUND

1. Technical Field

The disclosure relates to an electronic device with a heat dissipation structure.

2. Description of Related Art

With the continuing development of electronic technology, components of electronic devices, such as servers, generate a greater and greater deal of heat. The heat needs to be dissipated immediately to ensure the continued proper function of the electronic devices. Often, a plurality of fans is arranged at a side of the enclosure of the electronic device to generate airflow. However, the airflow will increase in temperature in the electronic device after cooling some elements, which affects the efficiency of cooling the elements farther down the path of the airflow.

BRIEF DESCRIPTION OF THE DRAWING

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The FIGURE is a schematic view of an embodiment of an electronic device.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Referring to the FIGURE, an electronic device 1 includes an enclosure 100. The enclosure 100 includes a motherboard area 10 adjacent to a first end of the enclosure 100 for mounting a motherboard 11. A power supply area 20 is located at a side of the motherboard area 10 for mounting a power supply 21. A hard disk drive area 30 is adjacent to a second end of the enclosure 100 substantially opposite to the first end for mounting hard disk drives 31. The first end is opposite to the second end. A fan area 40 is arranged in the middle of the enclosure 100 and between the motherboard area 10 and the hard disk drive area 30.

The enclosure 100 defines two venting areas 431 in opposite sidewalls 43 of the enclosure 100 and aligning with the fan area 40, and the first and the second fan assemblies 41, 42 are arranged between the two venting areas 431. The first fan assembly 41 and the second fan assembly 42 each include a plurality of fans 45. The first fan assembly 41 and the second fan assembly 42 are spaced from each other. The first fan assembly 41 faces the motherboard area 10 and the power supply area 20. The second fan assembly 42 faces the hard disk drive area 30.

When the electronic device operates, the airflow flows into the enclosure 100 through the venting areas 43 along the A and B directions. The second fan assembly 41 blows a part of the airflow to the motherboard area 10 and the power supply area 20 along C direction. The second fan assembly 42 blows another part of the airflow to the hard disk drive area 30 along D direction.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   an enclosure comprising a motherboard area at a first end of the enclosure for mounting a motherboard, a power supply area at the first end and adjacent to the motherboard area for mounting a power supply, a hard disk drive area at a second end of the enclosure substantially opposite to the first end for mounting hard disk drives, and a fan area arranged between the motherboard area and the hard disk drive area;
   a first fan assembly arranged in the fan area, and comprising a plurality of first fans facing the motherboard area and the power supply area; and
   a second fan assembly arranged in the fan area, and comprising a plurality of second fans facing the hard disk drive area.

2. The electronic device of claim 1, wherein the first fan assembly and the second fan assembly are spaced from each other.

3. The electronic device of claim 1, wherein the enclosure defines two venting areas in opposite sidewalls of the enclosure and aligning with the fan area, and the first and the second fan assemblies are arranged between the two venting areas.

* * * * *